US011126486B2

(12) United States Patent
Ganesan et al.

(10) Patent No.: US 11,126,486 B2
(45) Date of Patent: Sep. 21, 2021

(54) PREDICTION OF POWER SHUTDOWN AND OUTAGE INCIDENTS

(71) Applicant: DELL PRODUCTS, L.P., Round Rock, TX (US)

(72) Inventors: Vaideeswaran Ganesan, Bangalore (IN); Balamurugan Gnanasambandam, Pondicherry (IN); Tamilarasan Janakiram, Bangalore (IN); Sreeram Muthuraman, Trivandrum (IN)

(73) Assignee: Dell Products, L.P., Round Rock, TX (US)

( * ) Notice: Subject to any disclaimer, the term of this patent is extended or adjusted under 35 U.S.C. 154(b) by 4 days.

(21) Appl. No.: 16/171,332

(22) Filed: Oct. 25, 2018

(65) Prior Publication Data

US 2020/0133752 A1 Apr. 30, 2020

(51) Int. Cl.
| | |
|---|---|
| *G06F 11/00* | (2006.01) |
| *G06F 1/30* | (2006.01) |
| *G06F 11/30* | (2006.01) |
| *G06F 11/34* | (2006.01) |
| *G06F 11/07* | (2006.01) |

(52) U.S. Cl.
CPC .............. *G06F 11/008* (2013.01); *G06F 1/30* (2013.01); *G06F 11/0709* (2013.01); *G06F 11/3006* (2013.01); *G06F 11/3037* (2013.01); *G06F 11/3485* (2013.01); *G06F 11/3495* (2013.01); *G06F 2201/81* (2013.01); *G06F 2201/875* (2013.01)

(58) Field of Classification Search
CPC ...... G06F 11/008; G06F 11/3037; G06F 1/30; G06F 11/0709; G06F 11/3495; G06F 11/3485; G06F 11/3006; G06F 2201/875; G06F 2201/81
See application file for complete search history.

(56) References Cited

U.S. PATENT DOCUMENTS

| | | | |
|---|---|---|---|
| 7,149,889 B2 | 12/2006 | Stalker et al. | |
| 7,886,065 B1 | 2/2011 | Satish et al. | |
| 8,209,409 B2 | 6/2012 | Mopur et al. | |
| 9,058,123 B2 | 6/2015 | Joshi et al. | |
| 9,547,502 B2 | 1/2017 | Gavrilov | |
| 9,684,460 B1 * | 6/2017 | Colgrove | G06F 12/0238 |
| 9,710,321 B2 | 7/2017 | Zhao et al. | |
| 2006/0236165 A1 * | 10/2006 | Cepulis | G06F 11/1008 |
| | | | 714/721 |

(Continued)

*Primary Examiner* — Matthew M Kim
*Assistant Examiner* — Michael Xu
(74) *Attorney, Agent, or Firm* — Isidore PLLC (57) ABSTRACT

An information handling system (IHS), baseboard management controller (BMC) and method are provided for preventing critical operations when power shutdown is predicted. A service processor of a BMC of the IHS executes a predicted power operation (PPO) utility to monitor health data from physical memory devices of memory of the IHS. Based on the health data, the service processor predicts that at least one of the physical memory devices will fail, causing a power shutdown of the IHS. To prevent any critical operation that is executed by a host processing subsystem of the IHS being adversely affected by the shutdown, the service processor of the BMC updates information contained in a PPO software sensor to indicate the predicted power down.

20 Claims, 4 Drawing Sheets

(56) References Cited

U.S. PATENT DOCUMENTS

| | | | |
|---|---|---|---|
| 2010/0169031 A1* | 7/2010 | Dishman | G06F 1/30 |
| | | | 702/60 |
| 2012/0110582 A1* | 5/2012 | Ferdous | G06F 9/5044 |
| | | | 718/101 |
| 2013/0179624 A1* | 7/2013 | Lambert | G06F 12/0246 |
| | | | 711/103 |
| 2014/0089743 A1* | 3/2014 | Meir | G06F 1/30 |
| | | | 714/47.3 |
| 2015/0074469 A1* | 3/2015 | Cher | G06F 11/008 |
| | | | 714/47.2 |
| 2015/0309826 A1* | 10/2015 | Kirubanandam | G06F 11/07 |
| | | | 718/1 |
| 2019/0163392 A1* | 5/2019 | Leggette | G06F 3/0619 |

* cited by examiner

PREDICTION OF POWER SHUTDOWN AND OUTAGE INCIDENTS

BACKGROUND

1. Technical Field

The present disclosure relates in general to controllers that handle power operations within an information handling system (IHS), and more particularly to controllers that manage power shutdown as a result of hardware failure for the IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs can be required to provide highly available computing services with redundant data backups for mission critical processes. In information technology, high availability refers to a system or component that is continuously operational for a desirably long length of time. Availability can be measured relative to "100% operational" or "never failing." Significant information technology (IT) infrastructure and development has been invested into avoiding catastrophic loss of data or interruption in services. In particular, generally-known IHSs have to implement significant resources to promptly compensate for hardware component malfunctions of IHSs such as servers. Having a power supply fail can cause a rapid shutdown of the server. Similarly, a high volume of corruptible errors on dual inline memory modules (DIMMs) can create a shutdown fault of a host processing subsystem of the server. The hardware failure can lead to a rapid shutdown of the server. The server shuts down without having the ability to gracefully transition any assigned workload to another server.

BRIEF SUMMARY

In accordance with the teachings of the present disclosure, an information handling system (IHS) includes memory containing a critical operation utility. The IHS includes a host processor subsystem communicatively coupled to the memory and which executes the critical operation utility. IHS includes a baseboard management controller (BMC) communicatively coupled to the memory. The BMC includes a BMC memory having a predicted power operation (PPO) software sensor stored therein. The BMC also includes a service processor that executes a power operation utility to enable the IHS to: (i) monitor health data from the two or more physical memory devices; (ii) based on the health data, determine that a power down of the host processor subsystem is predicted due to a predicted failure of at least one of the two or more physical memory devices; and (iii) in response to determining that the power operation is predicted, update information contained in the PPO software sensor to indicate the predicted power down to prevent the host processor subsystem from executing the critical operations utility In accordance with the teachings of the present disclosure, a BMC of an IHS includes a communication interface communicatively coupled to memory of the IHS. A service processor is communicatively coupled to the communication interface and executes a PPO utility. The PPO utility enables the BMC to: (i) monitor health data from two or more physical memory devices of the memory of the IHS; (ii) based on the health data, determine that a power down of a host processor subsystem is predicted due to a predicted failure of at least one of the two or more physical memory devices; and (iii) in response to determining that the power down is predicted, update information contained in a PPO software sensor to indicate the predicted power operation to prevent the host processor subsystem from executing a critical operations utility contained in the memory.

In accordance with the teachings of the present disclosure, a method is provided of preventing critical operation when power shutdown is predicted due to hardware failure, in one or more embodiments, the method includes monitoring, by a BMC, health data from two or more physical memory devices of a memory of an IHS. Based on the health data, the method includes determining, by the BMC, that a power down of a host processor subsystem of the IHS is predicted due to a predicted failure of at least one of the two or more physical memory devices. In response to determining that the power operation is predicted, the method includes updating, by the BMC, information contained in a PPO software sensor contained in the BMC memory to indicate the predicted power operation to prevent the host processor subsystem from executing a critical operations utility contained in the memory.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

An information handling system (IHS), baseboard management controller (BMC) and method provide for preventing critical operations when power shutdown is predicted. A service processor of a BMC of the IHS executes a predicted power operation (PPO) utility to monitor health data from physical memory devices of memory of the IHS. Based on the health data, the service processor predicts that at least one of the physical memory devices will fail, causing a power shutdown of the IHS. To prevent any critical operation that is executed by a host processing subsystem of the IHS being adversely affected by the shutdown, the service processor of the BMC updates information contained in a PPO software sensor to indicate the predicted power down.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
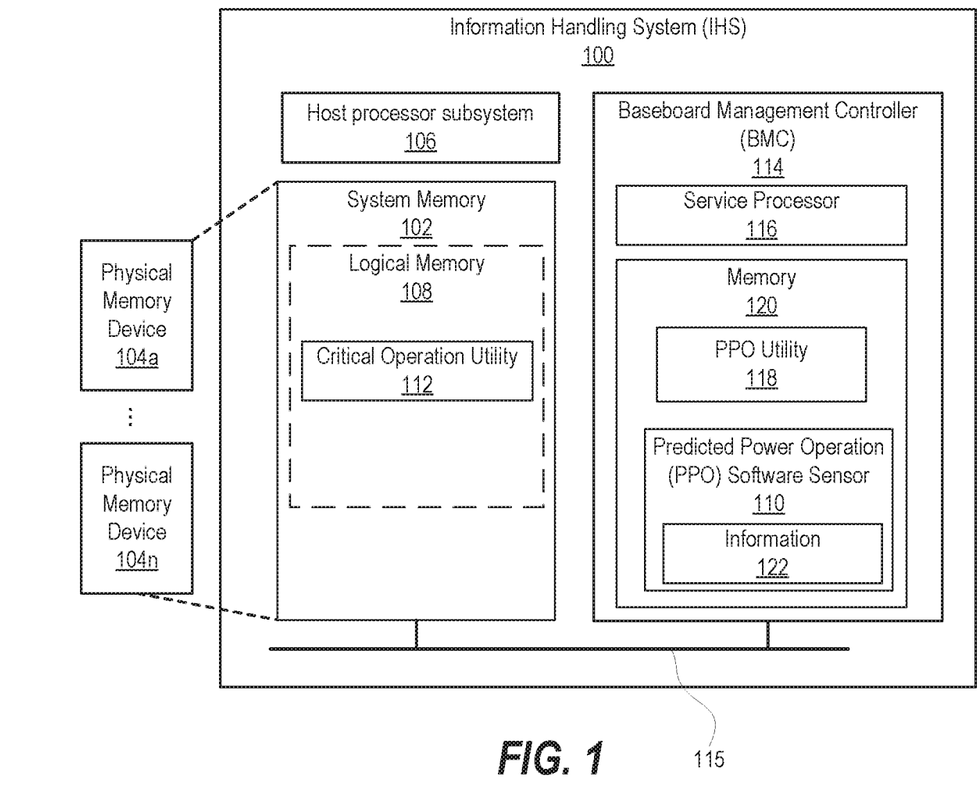
FIG. 1 is a simplified functional block diagram illustrating an information handling system (IHS) that avoids loss of data by not starting critical operations when a power shutdown is predicted due to hardware failure, according to one or more embodiments.

FIG. 1 is a simplified functional block diagram illustrating an information handling system (IHS) 100 that avoids loss of data by not starting critical operations when a power shutdown is predicted due to hardware failure. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS 100 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS 100 includes system memory 102 and host processor subsystem 106. Host processor subsystem 106 is communicatively coupled to system memory 102. System memory 102 includes two or more physical memory devices 104a-104n. Available portions of system memory 102 are mapped as logical memory 108 for use by host processing subsystem 106. Logical memory 108 contains: critical operation utility 112. Host processor subsystem 106 executes critical operation utility 112. Baseboard management controller (BMC) 114 includes predicted power operation (PPO) software sensor 110 that is contained in BMC memory 120. BMC 114 is communicatively coupled to system memory 102 via system interconnect 115. Service processor 116 of BMC 114 executes PPO utility 118 contained in memory 120 of BMC 114 to enable the IHS 100 to monitor health data from the two or more physical memory devices 104a-104n. Based on the health data, service processor 116 determines that a power down of host processor subsystem 106 is predicted due to a predicted failure of at least one of the two or more physical memory devices 104a-104n. In response to determining that the power operation is predicted, service processor 116 updates information 122 contained in the PPO software sensor 110 to indicate the predicted power down to prevent the host processor subsystem 106 from executing critical operations utility 112.

Figure 2:
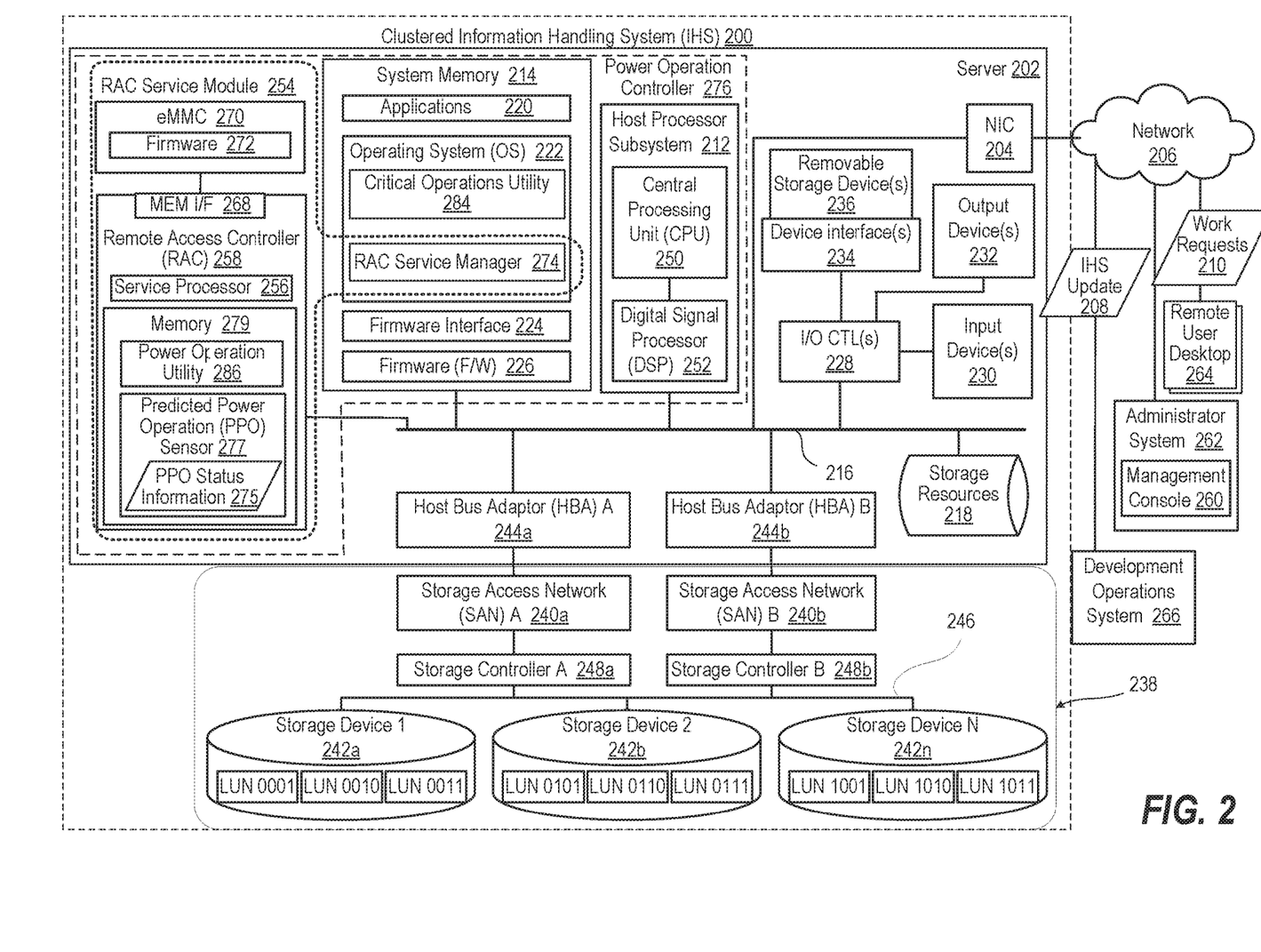
FIG. 2 illustrates a block diagram representation of an example clustered IHS having server that avoids critical operations when a predicted power shutdown or outage is predicted, according to one or more embodiments.

FIG. 2 illustrates a block diagram representation of an example clustered IHS 200 having server 202 that avoids critical operations when a predicted power shutdown or outage is predicted. Cluster IHS 200 is an example implementation of IHS 100 (FIG. 1). Critical operations can include maintaining high availability of delegated processes within a cluster. The delegated processes can include cluster operations and hypervisor operations. Server 202 includes a network interface, depicted as a network interface controller (NIC) 204, in communication via a network 206 for receiving IHS updates 208 and work requests 210 from remote devices and systems. A host processor subsystem 212 is coupled to system memory 214 via system interconnect 216. System interconnect 216 can be interchangeably referred to as a system bus, in one or more embodiments. System interconnect 216 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 216 can also be a Double Data Rate (DDR) memory interface. The system memory 214 can either be contained on separate removable dual inline memory module (RDIMM) devices or system memory 214 can be contained within persistent memory devices (NVDIMMs). For example, the NVDIMM-N variety of NVDIMMs contain both random access memory, which can serve as system memory 214, and non-volatile memory. It should be noted that other channels of communication can be contained within system interconnect 216, including but not limited to i2c or system management bus (SMBus). System interconnect 216 communicatively couples various system components including, for example, replaceable local storage resources 218 such as solid state drives (SDDs) and hard disk drives (HDDs) within which can be stored one or more software and/or firmware modules and one or more sets of data that can be utilized during operations of management IHS 200. Specifically, in one embodiment, system memory 214 can include therein a plurality of such modules, including one or more of application(s) 220, operating system (OS) 222, a firmware interface 224 such as basic input/output system (BIOS) or Uniform Extensible Firmware Interface (UEFI), and platform firmware (FW) 226. These software and/or firmware modules have varying functionality when their corresponding program code is executed by host processor subsystem 212 or secondary processing devices within IHS 200. For example, application(s) 220 may include a word processing application, a presentation application, and a management station application, among other applications.

IHS 200 further includes one or more input/output (I/O) controllers 228 that support connection by and processing of signals from one or more connected input device/s 230, such as a keyboard, mouse, touch screen, or microphone. I/O controllers 228 also support connection to and forwarding of output signals to one or more connected output devices 232, such as a monitor or display device or audio speaker(s). Additionally, in one or more embodiments, one or more device interfaces 234, such as an optical reader, a universal serial bus (USB), a card reader, Personal Computer Memory Card International Association (PCMCIA) slot, and/or a high-definition multimedia interface (HDMI), can be associated with IHS 200. Device interface(s) 234 can be utilized to enable data to be read from or stored to corresponding removable storage device/s 236, such as a compact disk (CD), digital video disk (DVD), flash drive, or flash memory card. In one or more embodiments, device interface(s) 234 can further include general purpose I/O interfaces such as inter-integrated circuit (I²C), system management bus (SMB), and peripheral component interconnect (PCI) buses.

NIC 204 enables IHS 200 and/or components within IHS 200 to communicate and/or interface with other devices, services, and components that are located external to IHS 200, represented as network devices such as administrator system 210. These devices, services, and components can interface with IHS 200 via an external network, such as example network 206, using one or more communication protocols that include transport control protocol (TCP/IP) and network block device (NBD) protocol. Network 206 can be a local area network, wide area network, personal area network, and the like, and the connection to and/or between network 206 and IHS 200 can be wired, wireless, or a combination thereof. For purposes of discussion, network 206 is indicated as a single collective component for simplicity. However, it should be appreciated that network 206 can comprise one or more direct connections to other devices as well as a more complex set of interconnections as can exist within a local area network or a wide area network, such as the Internet.

Remote and highly available storage is provided by a storage system 238 that includes storage area networks (SANs) 240a, 240b. Each SAN 240a, 240b is a high-speed network of shared storage systems, depicted as storage devices 242a, 242b, 242n. SANs 240a, 240b may be used to provide centralized data sharing, data backup, and storage management. Although SAN 240a, 240b in other embodiments may include multiple servers and multiple storage systems (not shown), for clarity, server 202 is presented as a single server having two host bus adapters (HBAs) 244a, 244b coupled to storage system 238 having storage devices 242a, 242b, 242n. Server 202 and storage system 238 are coupled to one another across a switching network 246. Switching network 246 is coupled to server 202 through the HBAs 244a, 244b. The storage units or logical unit numbers (LUNs) of the storage system 238 are accessed through the ports and storage controllers 248a, 248b of the storage system 238.

Host processor subsystem 212 can include at least one central processing unit (CPU) 250 that is augmented by a digital signal processor (DSP) 252. Host processor subsystem 212 interfaces to functional components of the IHS 200 such as a baseboard management controller (BMC). A remote access controller (RAC) service module 254 includes a specialized service processor 256 of a RAC 258 that performs BMC functionality. For example, the RAC 258 monitors the physical state of a computer, network server or other hardware device such as server 202 using sensors and communicating with a system administrator through an independent connection, such as NIC 204. As a non-limiting example, RAC 258 can be an improved integrated Dell Remote Access Controller (iDRAC) from Dell® that supports power operation functionality described herein. The iDRAC has the ability to edit/create files locally to itself. The iDRAC also has the ability to see OS specific files. RAC 258 performs out-of-band communication for the IHS 200 via the NIC 204 and network 206 to a network device, such as management console 260 on administrator system 262, remote user desktop 264, and development operations system 266.

Internal to RAC service module 254, RAC 258 can have access, via memory interface (I/F) 268, to a persistent storage device of RAC service module 254, such as an embedded multimedia card (eMMC) 270, which is local memory. The eMMC 270 is a flash memory and controller packaged into a small ball grid array (BGA) integrated circuit (IC) package for use in circuit boards as an embedded non-volatile memory system. eMMC 270 contains firmware 272. Request for power operation of service processor 256 can cause RAC 258 to restart. To interface with host processor subsystem 212, RAC service module 254 interacts with RAC service manager 274 that is contained in system memory 214 and executed by the host processor subsystem 212. RAC service manager 274 allows accessing and modifying status information 275 contained in predicted power operation (PPO) sensor 277, which is a software data structure contained in RAC memory 279.

Host processor subsystem 212 and RAC 258 can function together as power operation controller 276 to handle power operation requests without interrupting critical operations. RAC 258 can receive power operation requests that arise from intentionally or inadvertently from one of management console 260 on administrator system 262, remote user desktop 264, or development operations system 266. Host processor subsystem 212 can determine a need to perform a critical operation based on a detected problem or other maintenance need with network resources such as storage system 238. Power operation controller 276 includes supervisory power operations utility 284 in system memory 214 that is executed by host processing subsystem 212 in coordination with secondary power operation utility 286 executed by RAC 258. Power operation controller 276 determines whether a power operation request is received from a customer system, such as management console 260 on administrator system 262, remote user desktop 264, and development operations system 266. Power operation request can be associated with IHS upgrade software 208 that requires a restart to make a firmware change operational. In response to determining that the power operation request is received from the customer system, RAC 258 communicates the power operation request with host processing subsystem 212 via the RAC service manager 274 and PPO software sensor 277.

In one or more embodiments, IHS 200 uses power shutdown prediction to push back future reboot/power down request. PPO software sensor 277 coordinates predictive failure situations and reboot recommendations between a BMC, such as RAC 258, and host processing subsystem 212. Predictive failures triggering the power down requests are used to block critical operations on host processing subsystem 212. Various kinds of hardware can exhibit intermittent failure rates that provide predictions of becoming unusable or wholly failed. As one example, predictions can be based on trends in detected error rates in data communication or storage. As another example, predictions can be based on detection of an abnormally high temperature that is either being caused by a hardware fault or will result in failure to other computing components. RAC 258 can access such information either in-band or out-of-band. Based on this prediction, host processing subsystem 212 is informed not to pick any critical tasks during these times. If server 102 powers down when host processing subsystem 212 is doing any critical operation, the probability is very high for data loss or data corruption. Host processing subsystem 212 can check PPO software sensor 277 before starting any critical operation. If there is no predicted power operation scheduled, host processing subsystem 212 can start the critical operation.

RAC 258 monitors the hardware and identifies the critical components by measuring the health checkup. For example, RAC 258 can monitor usage levels and input/output (I/O) transfer rates for physical memory such as dual inline memory modules (DIMMs). DIMMs assigned for use as system memory 214 can be automatically categorized as critical components. In one example, RAC 258 can identify particular DIMMs as predicted for failure based on the usage level being above a threshold. In another embodiment, RAC 258 can identify particular DIMMs as predicted for failure based on an I/O transfer rate in a hard disk drive (HDD) that is above a threshold. An overused memory storage device can cause a failure. Server 102 can pass information to host processing subsystem 212 about any identified critical states of hardware that could cause a shutdown. During this time, high latency tasks like powering up virtual machines (VMs), tasks involving high read and write will be advised to drop or postpone. RAC 258 determines that the environment is stable by monitoring the load and other metrics of server 102 for over a specific duration. Host OS 222 checks PPO software sensor 277 before doing any critical operation and also checks for any probability of hardware failure. Host processing subsystem 212 then allows processing of any critical operation which involves major resources, such as more random-access memory (RAM) and free central processing units (CPUs), based on PPO software sensor 277 not indicating predicted failure.

Figure 3:
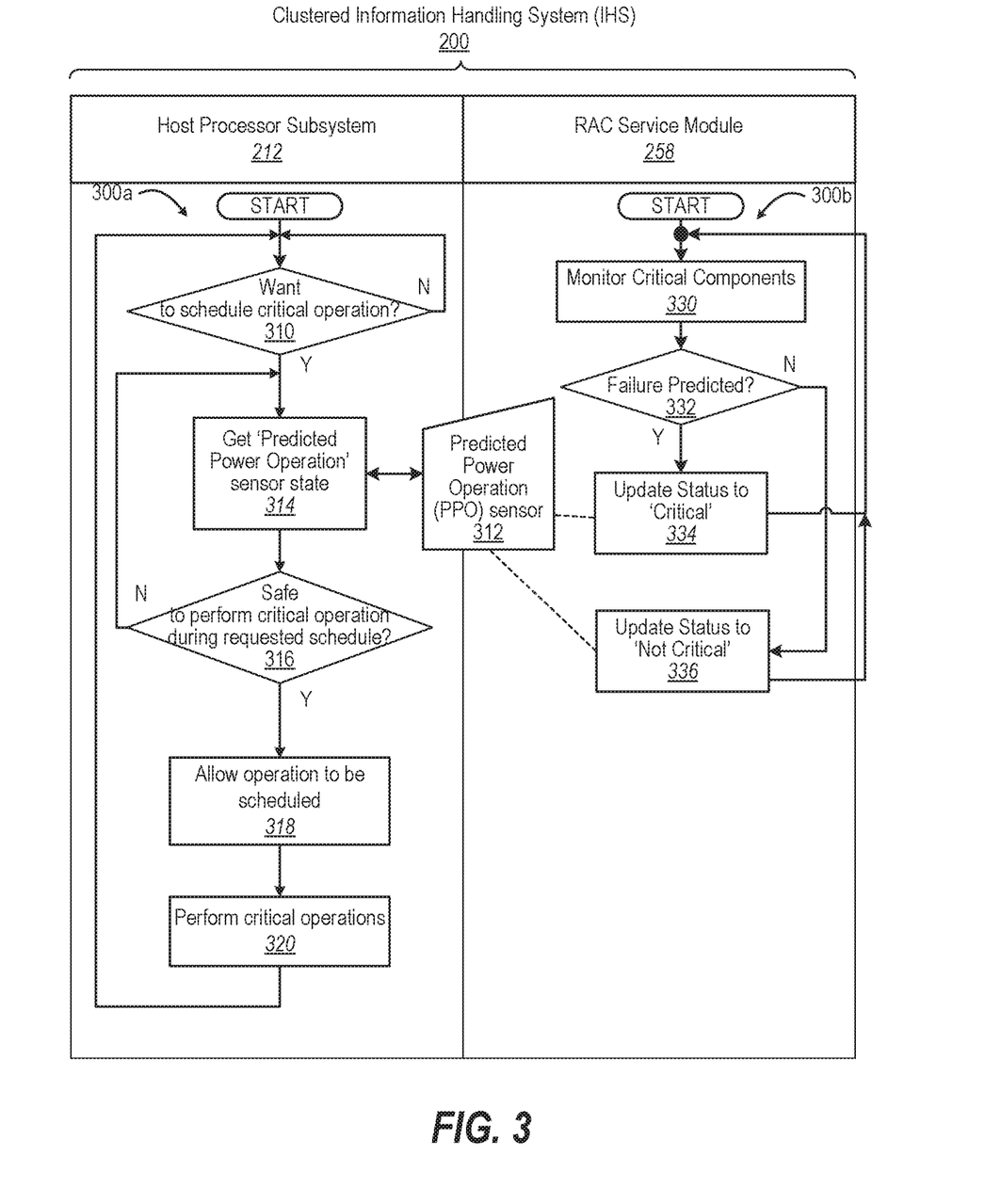
FIG. 3 is a flow diagram illustrating an interactive method between host processing subsystem and baseboard management controller (BMC) of an IHS, according to one or more embodiments.

FIG. 3 is a flow diagram illustrating an interactive method 300a and 300b between host processing subsystem 212 and RAC service module 258 of clustered IHS 200. RAC service module 258 performs functions of BMC in addition to other features. Host processing subsystem 212 makes a determination of whether performance of a critical operation is wanted (decision block 310). In response to determining that performance of a critical operation is not wanted, method 300a returns to block 310. In response to determining that performance of a critical operation is wanted, method 300a includes retrieving state of PPO software sensor 312 by host processing subsystem 212 (block 314). Method 300a includes determining, by host processing subsystem 212, whether state of PPO software sensor 312 is safe to perform critical operation (decision block 316). In response to determining that the state is not safe to perform critical operation, method 300a returns to block 314. In response to determining that the state is safe to perform critical operation, method 300a includes allowing critical operations by host processing subsystem 212 (block 318). Host processing subsystem 212 performs critical operations (block 320). Then method 300a returns to block 310.

Method 300b includes monitoring critical components by RAC service module 258 (block 330). A determination is made as to whether a failure is predicted by RAC service module 258 (decision block 332). In response to determining that a power operation is predicted due to a hardware failure, method 300b includes updating, by RAC service module 258, status in PPO software sensor 312 to "critical", based on failure prediction (block 334). Then, method 300b returns to block 330. In response to determining that a power operation is not predicted due to a hardware failure, method includes updating, by RAC service module 258, status in PPO software sensor 312 to "not critical" (block 336). Then method 300b returns to block 330.

Figure 4:
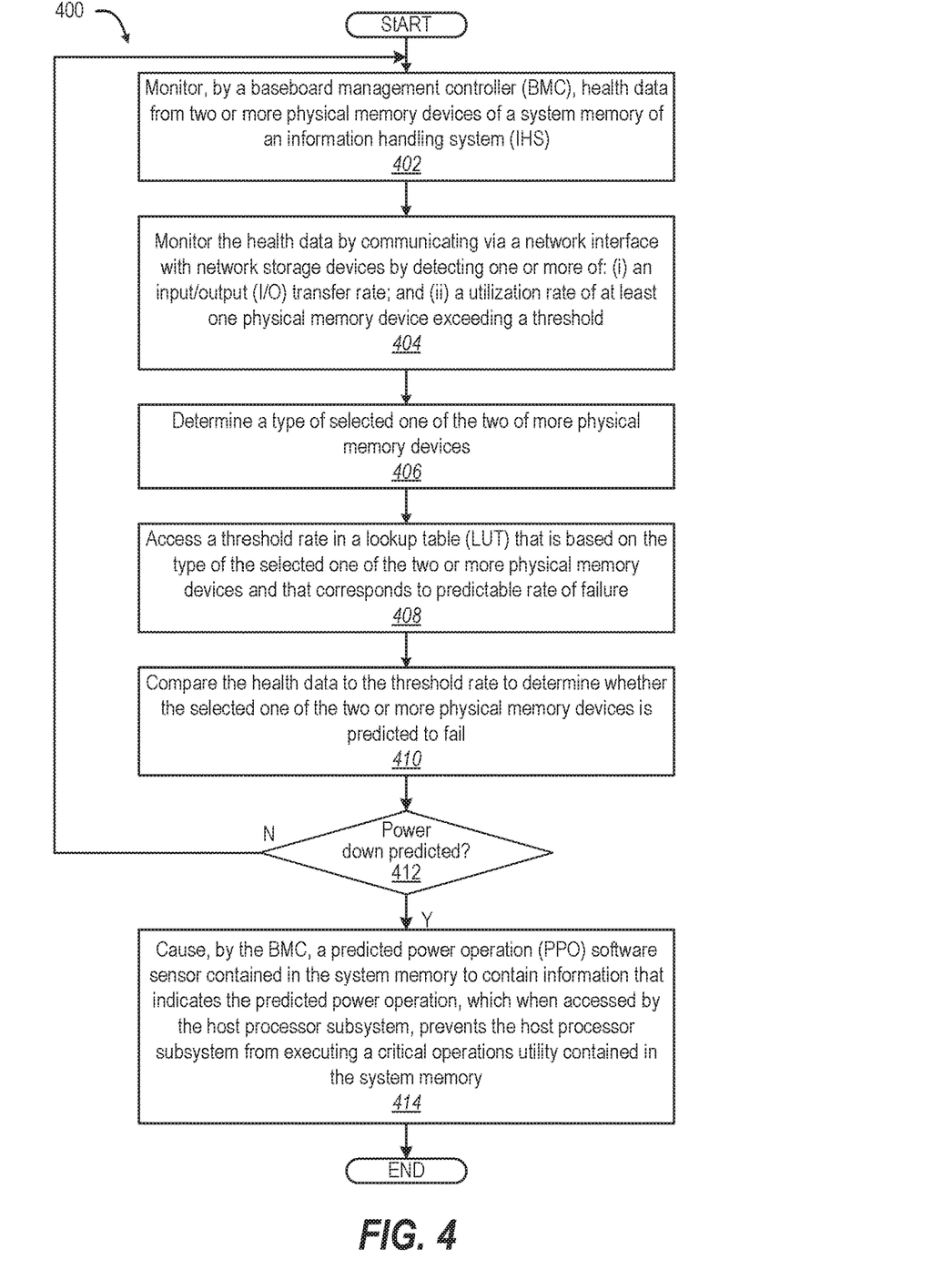
FIG. 4 is a flow diagram illustrating a method of preventing critical operations when a power shutdown of an IHS is predicted, according to one or more embodiments.

FIG. 4 is a flow diagram illustrating a method 400 of preventing critical operations when a power shutdown is predicted for the IHS based on health data of physical memory devices. In one or more embodiments, method 400 includes monitoring, by a baseboard management controller (BMC), health data from two or more physical memory devices of memory of an information handling system (IHS) (block 402).

In one or more embodiments, method 400 includes monitoring the health data by communicating via a network interface with network storage devices by detecting one or more of: (i) an input/output (I/O) transfer rate; and (ii) a utilization rate of at least one physical memory device exceeding a threshold (block 404).

In one or more embodiments, method 400 includes determining a type of selected one of the two of more physical memory devices (block 406). Method 400 includes accessing a threshold rate in a lookup table (LUT) that is based on the type of the selected one of the two or more physical memory devices and that corresponds to predictable rate of failure (block 408). Method 400 includes comparing the health data to the threshold rate to determine whether the selected one of the two or more physical memory devices is predicted to fail (block 410). Based on the health data, method 400 includes determining, by the BMC, whether a power down of a host processor subsystem of the IHS is predicted due to a predicted failure of at least one of the two or more physical memory devices (block 412). If not predicted to power down, method 400 returns to block 402. In response to determining that the power operation is predicted, method 400 includes updating, by the BMC, information contained in a predicted power operation (PPO) software sensor contained in the BMC/RAC memory to indicate the predicted power operation. When accessed by the host processing subsystem, information in PPO software sensor prevents the host processor subsystem from executing a critical operations utility contained in the memory (block 414). In one or more embodiments, the critical operation utility supports one of a single-tasked cluster operation and a virtual machine (VM). Then method 400 ends.

In the above described flow charts of FIGS. 3-4 one or more of the methods may be embodied in an automated control system, such as power operation controller 276 (FIG. 2) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   memory comprising two or more physical memory devices and containing a critical operation utility;
   a host processor subsystem communicatively coupled to the memory and which is capable of executing the critical operation utility; and
   a baseboard management controller (BMC) communicatively coupled to the memory, the BMC comprising BMC memory having (i) a predicted power operation (PPO) software sensor stored therein and (ii) a service processor that executes a PPO utility to enable the IHS to:
   monitor health data from the two or more physical memory devices;
   based on the health data comprising a utilization rate of at least one physical memory device exceeding a threshold, determine that a power down operation of the host processor subsystem is predicted due to a predicted failure of at least one of the two or more physical memory devices; and
   in response to determining that the power down operation is predicted, update information contained in the PPO software sensor to indicate scheduling of the predicted power down, the update preventing the host processor subsystem from executing the critical operations utility;
   wherein the PPO software sensor is accessible to the host processor subsystem and the host processor subsystem, in response to determining that a critical operation is to be performed, automatically checks current information stored within the PPO software sensor prior to initiating execution of the critical operation utility and only performs a critical operation when the current information within the PPO software sensor does not indicate a predicted failure, the critical operation being an operation that has a high probability for causing data loss or data corruption when the IHS is powered down while the host processing subsystem is performing the critical operation.

2. The IHS of claim 1, wherein the host processor subsystem:
   determines that performance of a critical operation is wanted;
   in response to determining that the performance of the critical operation is wanted: accesses and checks the PPO software sensor prior to scheduling execution of the critical operation; and
   determines whether the PPO software sensor contains information that indicates that a power down operation is predicted; and
   in response to determining that the PPO software sensor contains the information that indicates that the power down operation is predicted, prevents execution of the critical operations utility.

3. The IHS of claim 2, wherein the critical operation utility supports one of a single-tasked cluster operation and a virtual machine (VM).

4. The IHS of claim 1, wherein, the health data from the two or more physical memory devices further comprises an input/output (I/O) transfer rate.

5. The IHS of claim 1, further comprising a network interface, wherein:
   the two or more physical memory devices comprise network storage devices communicatively coupled to the IHS via the network interface; and
   the BMC comprises a remote access controller (RAC) service module comprising:
      embedded memory containing the power operation utility;
      a communication interface communicatively coupled to the network interface;
      a RAC service manager contained in the memory and executed by the host processor subsystem of the IHS to access and modify the information contained in the PPO software sensor; and
      a RAC communicatively coupled to the memory, the embedded memory, and the communication interface, the RAC comprising the service processor which executes the power operation utility that enables the RAC service module to receive the health data via a network interface of the IHS.

6. The IHS of claim 5, wherein the RAC identifies a particular dual inline memory module (DIMM) as predicted for failure based on a usage level being above a threshold.

7. The IHS of claim 1, wherein a selected one of the host processor subsystem and the service processor:
   determines a type of a selected one of the two of more physical memory devices;
   accesses a threshold rate in a lookup table (LUT) that is based on the type of the selected one of the two or more physical memory devices and that corresponds to a predictable rate of failure; and
   compares the health data to the threshold rate to determine whether the selected one of the two or more physical memory devices is predicted to fail.

8. The IHS of claim 1, wherein a server passes information to the host processing subsystem about any identified critical states of hardware that could cause a shutdown and the host processing subsystem postpones the high latency task of powering up virtual machines (VMs).

9. The IHS of claim 1, wherein the predicted failure is based on at least one of: (i) trends in detected error rates in data communication or storage; (ii) detection of an abnormally high temperature that is either being caused by a hardware fault or will result in failure to other computing components.

10. A baseboard management controller (BMC) of an information handling system (IHS), the BMC comprising:
    a communication interface communicatively coupled to memory of the IHS; and
    a service processor communicatively coupled to the communication interface and that executes a predicted power operation (PPO) utility to enable the BMC to:
       monitor health data from two or more physical memory devices of the memory of the IHS, at least one of the two or more physical memory devices comprising a critical operation utility;
       based on the health data identifying that a utilization rate of at least one physical memory device is exceeding a threshold, determine that a power down operation of a host processor subsystem is predicted due to a predicted failure of at least one of the two or more physical memory devices; and
       in response to determining that the power down operation is predicted, update information contained in a PPO software sensor contained in BMC memory to contain information that indicates the predicted power down operation to prevent the host processor subsystem from executing the critical operation utility contained in the memory;
    wherein the PPO software sensor is accessible to the host processor subsystem and the host processor subsystem, in response to determining that a critical operation is to be performed, automatically checks current information stored within the PPO software sensor prior to initiating execution of the critical operation utility contained within the at least one physical memory device and only performs a critical operation when the current information within the PPO software sensor does not indicate a predicted failure, the critical operation being an operation that has a high probability for causing data loss or data corruption when the IHS is powered down while the host processing subsystem is performing the critical operation.

11. The BMC of claim 10, wherein the critical operations comprise maintaining high availability of delegated processes comprising cluster operations and hypervisor operations within a cluster and the critical operation utility supports one of a single-tasked cluster operation and a virtual machine (VM).

12. The BMC of claim 10, wherein the health data from the two or more physical memory devices comprises an input/output (I/O) transfer rate.

13. The BMC of claim 10, further comprising a network interface communicatively coupled to a remote system, wherein:
    the two or more physical memory devices comprise network storage devices communicatively coupled to the IHS via a network interface; and
    the BMC comprises a remote access controller (RAC) service module comprising:
       a RAC service manager contained in the memory and executed by the host processor subsystem of the IHS to interact with the PPO software sensor;
       a RAC communicatively coupled to the communication interface, the RAC comprising the service processor which executes the power operation utility that enables the RAC service module to receive health data via a network interface of the IHS.

14. The BMC of claim 10, wherein the service processor determines that the power down of the host processor subsystem is predicted by:

determining a type of a selected one of the two of more physical memory devices;

accessing a threshold rate in a lookup table (LUT) that is based on the type of the selected one of the two or more physical memory devices and that corresponds to predictable rate of failure; and comparing the health data to the threshold rate to determine whether the selected one of the two or more physical memory devices is predicted to fail.

15. A method of preventing critical operation when power shutdown is predicted due to hardware failure, the method comprising:

monitoring, by a baseboard management controller (BMC), health data from two or more physical memory devices of memory of an information handling system (IHS);

based on the health data indicating that a utilization rate of at least one physical memory device is exceeding a threshold, determining, by the BMC, that a power down operation of a host processor subsystem of the IHS is predicted due to a predicted failure of at least one of the two or more physical memory devices; and in response to determining that the power down operation is predicted, updating, by the BMC, information contained in a predicted power operation (PPO) software sensor to indicate the predicted power down operation to prevent the host processor subsystem from executing a critical operations utility contained in the memory;

wherein the PPO software sensor is accessible to the host processor subsystem and the host processor subsystem, in response to determining that a critical operation is to be performed, automatically checks current information stored within the PPO software sensor prior to initiating execution of the critical operation utility and only performs a critical operation when the current information within the PPO software sensor does not indicate a predicted failure, the critical operation being an operation that has a high probability for causing data loss or data corruption when the IHS is powered down while the host processing subsystem is performing the critical operation.

16. The method of claim 15, further comprising:

determining, by the host processing subsystem, whether the PPO software sensor contains information that indicates that a power down operation is predicted; and in response to determining that the PPO software sensor contains the information that indicates that the power down operation is predicted, preventing, by the host processing subsystem, execution of the critical operations utility.

17. The method of claim 16, wherein the critical operations comprise maintaining high availability of delegated processes comprising cluster operations and hypervisor operations within a cluster and the critical operation utility supports one of a single-tasked cluster operation and a virtual machine (VM).

18. The method of claim 15, wherein monitoring health data from the one or more physical memory devices comprises detecting an input/output (I/O) transfer rate.

19. The method of claim 15, wherein monitoring the health data comprises communicating via a network interface with network storage devices.

20. The method of claim 15, further comprising:

determining a type of a selected one of the two of more physical memory devices;

accessing a threshold rate in a lookup table (LUT) that is based on the type of the selected one of the two or more physical memory devices and that corresponds to predictable rate of failure; and comparing the health data to the threshold rate to determine whether the selected one of the two or more physical memory devices is predicted to fail.

* * * * *